United States Patent
Lee

(10) Patent No.: US 7,038,764 B2
(45) Date of Patent: May 2, 2006

(54) APPARATUS FOR DETERMINING PROJECTILE'S VELOCITY

(76) Inventor: Fu Ching Lee, P.O. Box 6611, Beverly Hills, CA (US) 90212

( * ) Notice: Subject to any disclaimer, the term of this patent is extended or adjusted under 35 U.S.C. 154(b) by 126 days.

(21) Appl. No.: 10/690,968

(22) Filed: Oct. 23, 2003

(65) Prior Publication Data

US 2005/0088645 A1 Apr. 28, 2005

(51) Int. Cl.
*G01P 3/36* (2006.01)
(52) U.S. Cl. ........................................ 356/28; 273/333
(58) Field of Classification Search ................ 356/28; 273/333, 371, 378
See application file for complete search history.

(56) References Cited

U.S. PATENT DOCUMENTS

| | | | | |
|---|---|---|---|---|
| 3,619,029 A | * | 11/1971 | Crownover | ................ 359/201 |
| 4,150,825 A | * | 4/1979 | Wilson | ........................ 473/152 |
| 4,562,005 A | * | 12/1985 | Nojima et al. | .............. 558/166 |
| 4,577,863 A | * | 3/1986 | Ito et al. | ...................... 473/453 |
| 4,870,267 A | * | 9/1989 | Beeckel | ................... 250/222.1 |
| 5,196,689 A | * | 3/1993 | Sugita et al. | ............ 250/206.1 |
| 5,230,505 A | | 7/1993 | Paquet et al. | |
| 5,443,260 A | * | 8/1995 | Stewart et al. | .............. 473/451 |
| 5,602,638 A | | 2/1997 | Boulware | |
| 5,846,139 A | * | 12/1998 | Bair et al. | .................. 473/156 |
| 6,414,747 B1 | | 7/2002 | Hardy | |

* cited by examiner

*Primary Examiner*—Thomas H. Tarcza
*Assistant Examiner*—Isam Alsomiri

(57) ABSTRACT

This invention is an apparatus and method for determining the velocity of a projectile. A light curtain unit (20) creates two light curtains (46)(48) and two sensing planes (50)(52). The projectile causes light from the light curtain (46)(48) to be reflected into the detectors (22*a*) and (24*a*) of the sensing planes (50)(52). The time for a projectile to pass through one sensing plane to the other is measured and calculated for display by the Display Unit (10).

5 Claims, 3 Drawing Sheets

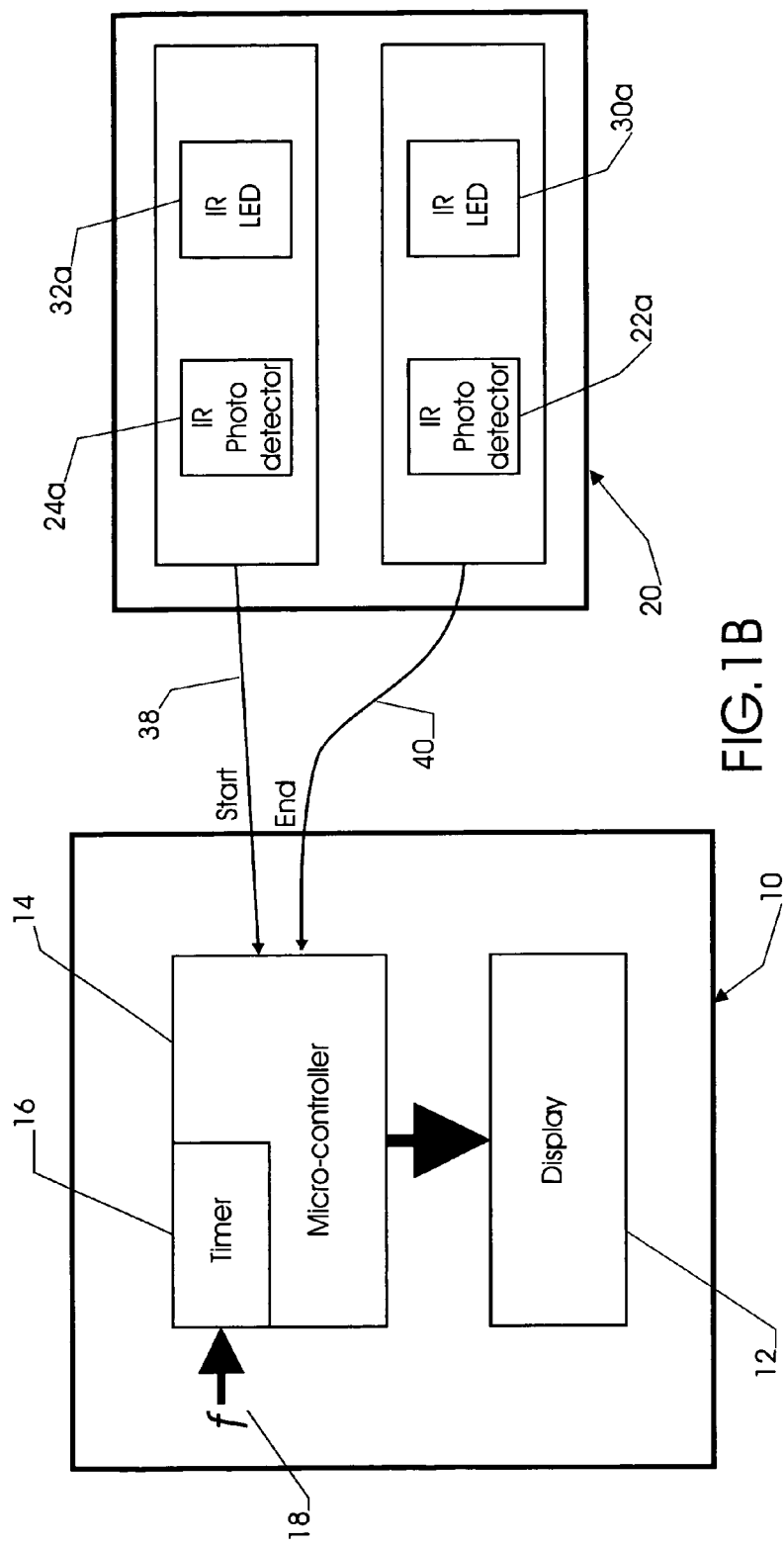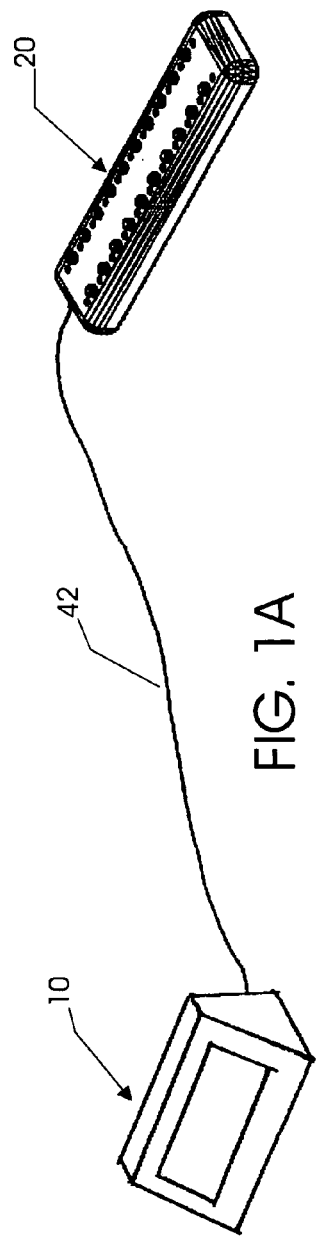
FIG. 1A
FIG. 1B

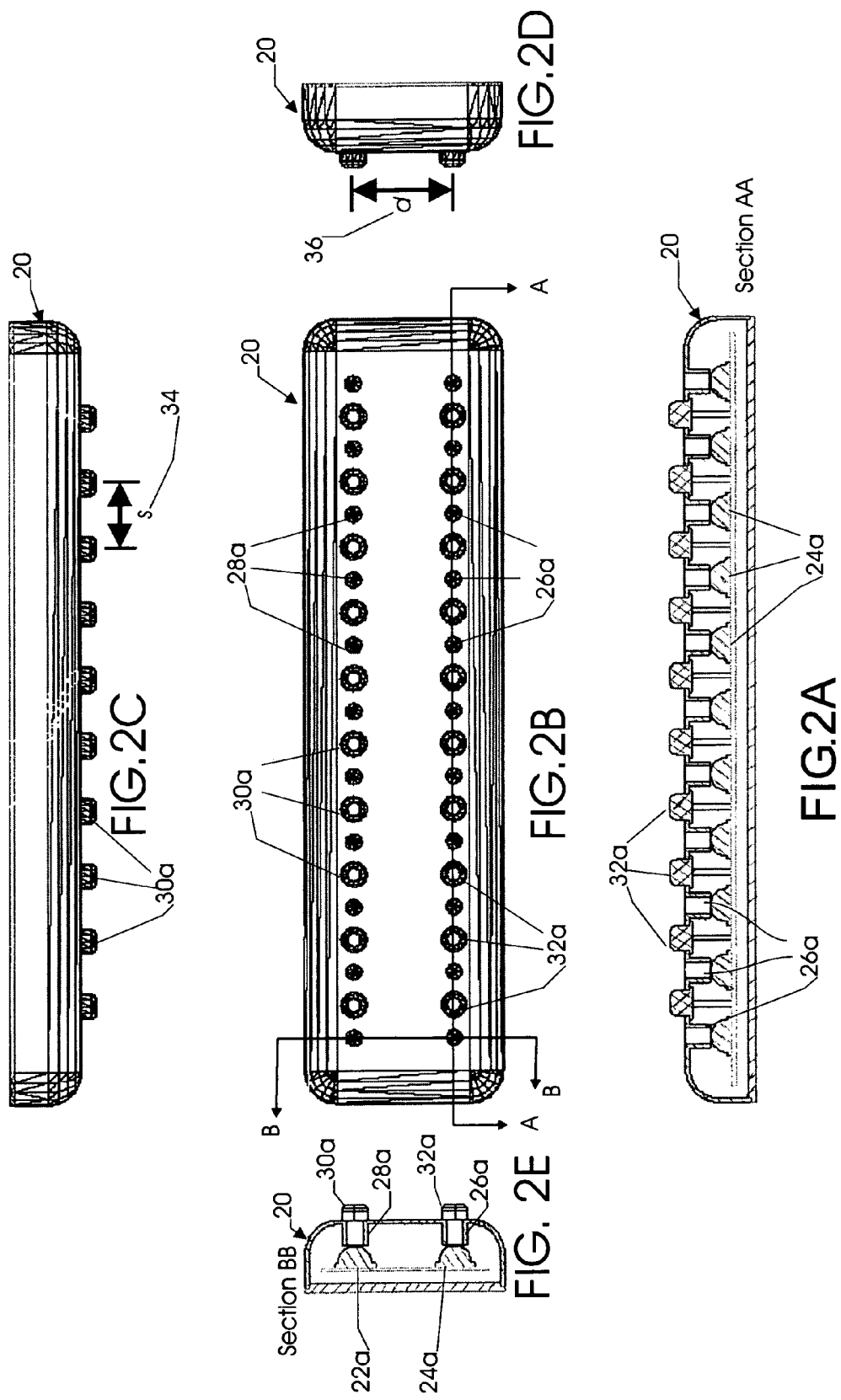

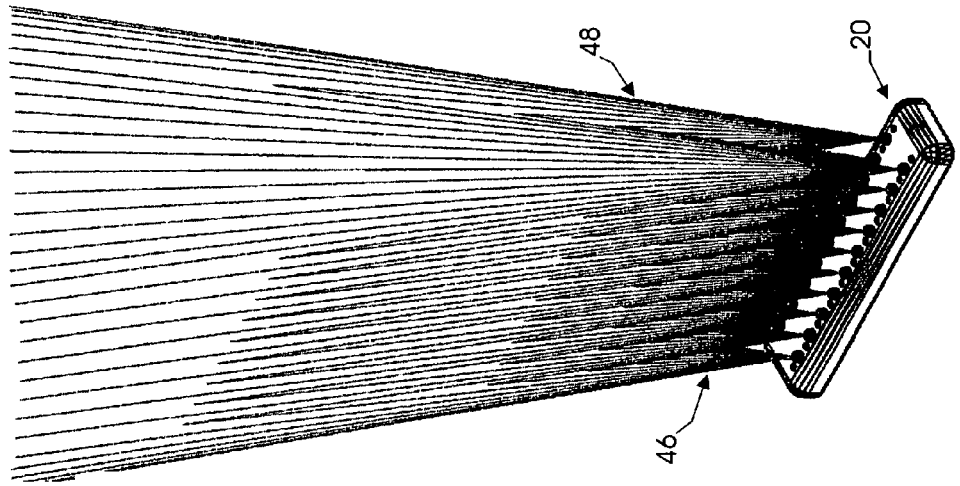
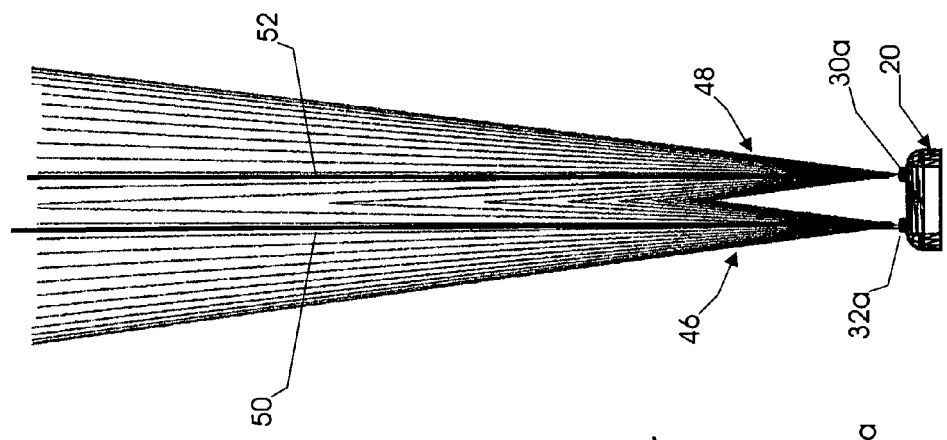
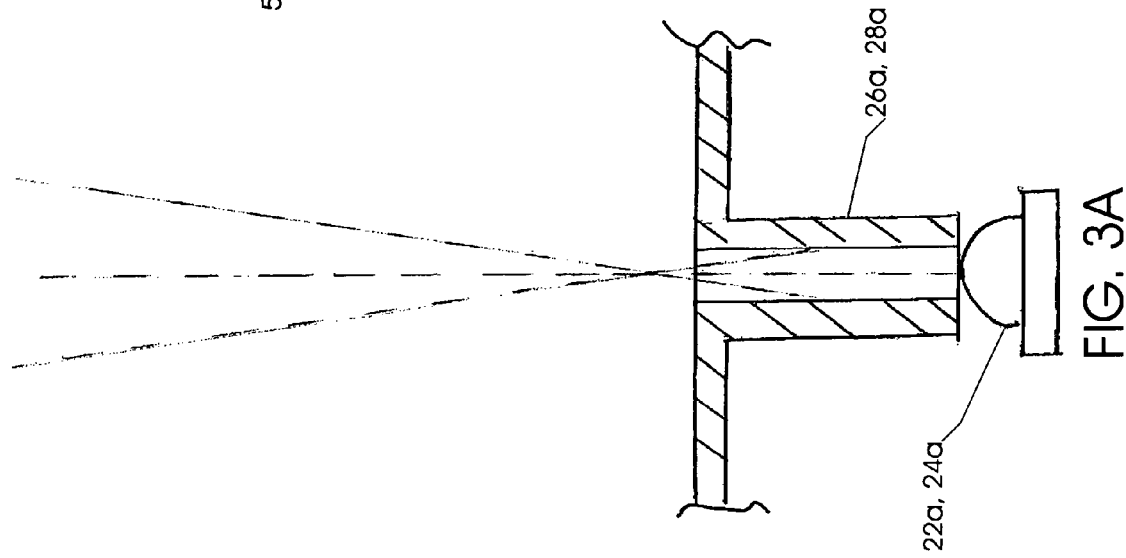

APPARATUS FOR DETERMINING PROJECTILE'S VELOCITY

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION—FIELD OF INVENTION

This invention relates to an apparatus for determining a projectile's velocity, specifically to projectiles utilized in general sports and game play.

BACKGROUND OF THE INVENTION

In sports and games involving projectiles such as baseball, tennis, golf etc., any increase in the velocity of the projectile is highly desired. Thereafter inventors have created several types of training aids to provide velocity indications to the user. U.S. Pat. No. 6,416,747 to Hardy (2002) discloses an infrared photodetector apparatus for measuring projectile velocity; however the apparatus is bulky, hard to setup and expensive to manufacture. U.S. Pat. No. 5,602,638 to Boulware (1997) discloses a system that is less bulky but still expensive to manufacture more over this system requires the size of the projectile to be known as the speed determination is based on the diameter of the projectile. Other patents such as U.S. Pat. No. 5,230,505 also discloses systems to measure a projectiles velocity but as a whole they are mainly applicable to pitching type games and sports such as baseball or softball and are impractical to modify for other games and sports such as tennis or golf etc.

BACKGROUND OF THE INVENTION—OBJECTS AND ADVANTAGES

Accordingly, several objects and advantages of my invention are:

(a) to provide a training aid which will provide accurate indication of a projectile's velocity;

(b) to provide a training aid which will require a minimum of transmitters and receivers;

(c) to provide a training aid which will be adaptable to all projectile type sports and games; and (d) to provide a training aid which is small and portable.

Still further objects and advantages will become apparent from consideration of the ensuing description and drawings.

SUMMARY

In accordance with the above-mentioned objects and advantages, the present invention consists of an apparatus for determining the velocity of a projectile moving along a trajectory, the apparatus comprising:

a first infrared light curtain, formed by the first array of infrared emitters, and a sensing plane, formed by the first array of light guiding openings and the first array of infrared detectors. The first sensing plane is formed perpendicular to the trajectory. A second infrared light curtain, formed by the second array of infrared emitters, and a sensing plane, formed by the second array of light guiding openings and the second array of infrared detectors. The second sensing plane is parallel to the first sensing plane and of a known distance from the first sensing plane;

the infrared detectors producing signals indicative of a projectile passing the sensing planes. The crossing of the first sensing plane causing a START signal and the crossing of the second sensing plane causing an END signal;

processing means for receiving the START and END signals and determining the velocity of the projectile as a function of the START-END duration with the known separation of the first sensing plane and the second sensing plane;

and an output means for representing the velocity of the projectile.

DRAWINGS—FIGURES

FIG. 1A shows a perspective view of a training aid embodying the apparatus of the present invention.

FIG. 1B shows a block diagram of the different elements of the apparatus.

FIGS. 2A, 2B, 2C, 2D and 2E shows different views of a training aid embodying the apparatus of the present invention.

FIG. 3A shows light rays perpendicular to a detector entering.

FIGS. 3B and 3C shows a configuration of light curtains.

DETAILED DESCRIPTION

FIG. 1A shows a training aid consisting of a Display Unit 10 connected to a Light Curtain Unit 20 via a length of wire 42.

FIGS. 2A, 2B, 2C, 2D, and 2E shows the Light Curtain Unit 20 in more detail. FIGS. 3B and 3C shows a view of a light curtain. The Light Curtain Unit 20 develops a first infrared light curtain 46 made up of an array of infrared light emitting diodes 32*a*. A second infrared light curtain 48 is made up of an array of infrared light emitting diodes 30*a*. The distance between the light emitting diodes making up the light curtains is S, 34. S should be slightly less than the diameter of the projectile to be measured.

A first sensing plane 50 is created by an array of light guiding openings 26*a* directly below, which is located an array of infrared detectors 24*a*. A second sensing plane 52 is created by an array of light guiding openings 28*a* directly below, which is located an array of infrared detectors 22*a*. The separation of the sensing screen is d 36. d is approximately 2 inches in this embodiment.

The light guiding opening 26*a* and 28*a* should have a depth at least 10 times the diameter of the opening. This will ensure that only light approximately perpendicular to the detector will be able to enter the opening. This is shown graphically in FIG. 3A. The infrared detector 24*a* and 22*a* are commercially available infrared detectors with amplification and ambient light rejection circuitry built in.

FIG. 1B shows a block diagram of the Display Unit 10 and the Light Curtain Unit 20. The Display Unit 10 consists of a processing unit 14 such as a micro-controller or a computer. A timer 16 counter is included clocked by a frequency source 18 of frequency f. The processing unit 14 activates a display unit 12. The display unit 12 can be any visible digit display and or audio transducer. The processing unit 14 receives a Start signal 38 and an End signal 40 from the Light Curtain Unit 20.

Operations.

The first 46 and second light curtains 48 are created when the infrared light emitting diodes 30a and 32a are driven by high current pulses. The pulse rate is set to match the pulse rate required by the detectors 24a and 22a. The infrared light emitting diodes 30a and 32a has a beam spread of approximately +/−15 degrees and as such after a height of around 3 feet the light curtain is more light a light cloud with the infrared beams overlapping due to beam spread. Some infrared light emitting diodes have worst beam spreading characteristics and the 'light cloud' would be achieved at a lower distance from the diodes.

Irrespective of which types of infrared light emitting diodes are used it is important for measurement accuracy that the sensing planes only respond to light near perpendicular to the detector. To achieve this an array of light guiding openings 26a and 28a is including in the composition of the sensing planes. By forming the openings such that the depth of the opening is at least 10 times the diameter of the opening means only light traveling perpendicular to the detector can be detected.

As the projectile travels through its trajectory it enters the first light curtain 46. The projectile will scatter or reflect the infrared light. Due to the composition of the sensing plane 50, the reflected infrared light will not activate the detector 24a unless the reflected infrared light is perpendicular to the detector 24a i.e. the projectile is directly over the detector 24a. The projectile will enter the second light curtain 52 and again will activate the detector 22a when it passes directly over the detector 22a. The relative position of the projectile to the detector to activate the detector would approximately be the same since both sensing planes are the same.

As the first sensing plane 50 detects the projectile a signal START 38 is transmitted to the Display Unit 10. As the second sensing plane 52 detects the projectile a signal END 40 is transmitted to the Display Unit 10.

The processing unit 14 initiates a count on receipt of the START 38 signal and the count is terminated on receipt of the END 40 signal. The count is updated at a frequency determined by the clock source 18.

If the count is C, the clock frequency is f and the distance separating the sensing plane is d then the velocity is given by the following:

$$\frac{X}{C} = \text{velocity in miles per hour (mph)}$$

$X = (1/17.6 * d * f) + k$

{17.6 is 1 mph express as inch per sec;}
{k is a constant to account for delays in the measuring loop.}
{X becomes a constant since d, f and k are known}

The processing unit 14 calculates the velocity based on the above formula and directs the display unit 12 to display a representation of the velocity.

Conclusion, Ramifications and Scope of Invention.

Thus the reader will see that the velocity determining apparatus of the invention provides a portable, accurate yet economical system. Furthermore the apparatus has the additional advantages in that it provides an accurate indication of a projectile's velocity;

it provides a minimum of transmitters and receivers;

it will be adaptable to all projectile type sports and games; and it is small and portable.

While my above description contains many specificities, these should not be construed as limitations on the scope of the invention, but rather as an exemplification of one preferred embodiment thereof. Many other variations are possible. For example, different enclosure for the first light curtain and a separate enclosure for the second light curtain; single unit combining the display unit with the light curtain unit, etc.

Accordingly, the scope of the invention should be determined not by the embodiment illustrated, but by the appended claims and their legal equivalent.

The invention claimed is:

1. An apparatus for determining the velocity of a projectile moving along a trajectory, said apparatus comprising of:

a first sensing plane perpendicular to said trajectory comprising a plurality of light emitting devices and a plurality of light sensitive detectors, the light emitting device being position to emit light beams to form a first light curtain in a plane perpendicular to said trajectory, the light sensitive detectors being position to form a first detecting plane perpendicular to said trajectory and parallel to said first light curtain, the said first detecting plane to be position close to the first light curtain so as to be able to detect reflected light from the first light curtain, the said reflected light as caused to be reflected as the projectile passes the first light curtain, the light sensitive detectors having the means for producing a first signal indicative of the entry of the projectile into the first light curtain;

a second sensing plane perpendicular to said trajectory comprising a plurality of light emitting devices and a plurality of light sensitive detectors, the light emitting device being position to emit light beams to form a second light curtain in a plane perpendicular to said trajectory, the light sensitive detectors being position to form a second detecting plane perpendicular to said trajectory and parallel to said second light curtain, the said second detecting plane to be position close to the second light curtain so as to be able to detect reflected light from the second light curtain, the said reflected light as caused to be reflected as the projectile passes the second light curtain, the light sensitive detectors having the mean for producing a second signal indicative of the entry of the projectile into the second light curtain, the said second sensing plane being position parallel to said first sensing plane and aligned with said trajectory a distance apart;

means responsive to said first and second signal for measuring the interval between the passage of said projectile through said first sensing plane to said second sensing plane for calculating a velocity corresponding to the measured time and the distance between said first and second sensing plane and displaying said calculated speed;

an enclosure with a plurality of openings along one planar face, said openings to coincide with said light emitting devices and said light sensitive detectors of said first and said second sensing plane and said light emitting devices and said light sensitive detectors are contained within said enclosure below said openings.

2. The apparatus of claim 1, wherein the light emitting devices comprises of infrared light emitting diodes.

3. The apparatus of claim 1, wherein the light sensitive detectors comprises of infrared sensitive detectors with amplification and ambient light rejection circuitry.

4. The apparatus of claim 1, wherein the detecting planes means comprises a plurality of openings with dimensional characteristics of a cylinder having a length much longer than the diameter of the opening to cause rejection of stray reflected light from being detected and allowing reflected light parallel to detecting plane from entering.

5. A method for determining the velocity of a projectile moving along a trajectory, said method comprising the steps of:

molding a synthetic resin material to obtain an enclosure with a plurality of openings in one planar face;

emitting first parallel light beams from said openings in a first direction perpendicular to said trajectory to form a first light curtain;

detecting reflected light from said first light curtain through said openings as said projectile passes said first light curtain;

deriving a first signal indicative of said projectile entering said first light curtain;

emitting a second parallel light beams from said openings in a second direction perpendicular to said trajectory to form a second light curtain;

detecting reflected light from said second light curtain through said openings as said projectile passes said second light curtain;

deriving a second signal indicative of said projectile entering said second light curtain;

determining the velocity of said projectile from said first and second signal comprises the steps of;

recording the number of periods, C, generated by a clock source between said first signal and said second signal;

calculating the velocity of said projectile by the following formula:

$$X = \text{velocity in miles per hour.}$$

$$C.$$

* * * * *